Aug. 30, 1927.

F. M. FURBER

OIL CUP 1,640,495

Filed Nov. 28, 1923

INVENTOR
Frederick M. Furber,
By his Attorney,
J. H. McCredy.

Patented Aug. 30, 1927.

1,640,495

UNITED STATES PATENT OFFICE.

FREDERICK M. FURBER, OF REVERE, MASSACHUSETTS; SAMUEL R. CUTLER ADMINISTRATOR OF SAID FREDERICK M. FURBER, DECEASED.

OIL CUP.

Application filed November 28, 1923. Serial No. 677,390.

This invention relates to devices commonly known as "oil cups." Such devices are widely used on machinery to supply oil, grease or the like to friction surfaces.

An oil cup usually is equipped with a threaded shank by means of which it is secured in its operative position. In threading an oil cup into place it is a very common practice to grip the body of the cup with a pair of gas pliers in order to give it the last few turns necessary to thread it tightly into the machine part to which it is to be secured. This very frequently results in breaking the joint or union between the cup body and its shank, thus not only ruining the cup, but also leaving a threaded nipple tightened into a machine part where it can often be removed only with some difficulty. In many cases, however, it is practically impossible to install an oil cup in any other way. That is, it must be placed in a position which is so difficult of access that it is impossible to use a wrench on the square or hexagonal shank of the oil cup.

With these considerations in view, the present invention aims to devise an oil cup construction which, while being unusually sturdy and substantial in construction, can, at the same time, be maufactured very economically. The invention is especially concerned with the union or joint between the oil cup body and its shank.

It is also an object of the invention to improve the cover construction of oil cups with a view to effecting economies in manufacture, and to devising a cover which will be more convenient to use than prior constructions.

The nature of the invention will be readily understood from the following description when read in connection with the accompanying drawings, and the novel features will be particularly pointed out in the appended claims.

Referring now to the drawings.

Figure 4:
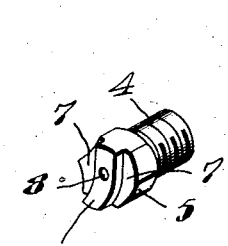
Fig. 4 is a perspective view of the shank or base of the oil cup.
Figure 1:
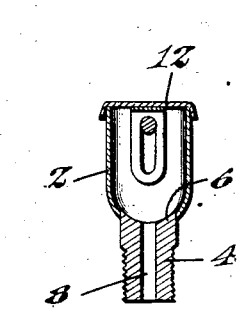
Figure 1 is a vertical, central, cross-sectional view of an oil cup embodying the present invention.
Figure 5:
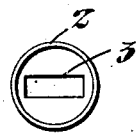
Figs. 5 and 6 are plan and side views, respectively, of the body of the oil cup shown in Fig. 1.
Figure 6:
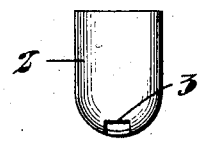

Referring first to Figs. 1, 5 and 6, it will be seen that the oil cup shown comprises a cup-shaped body 2 having a hemispherical lower end. A slot 3 is formed in this lower end. The shank or base 4 of the oil cup is best shown in Fig. 4, and it comprises a screw threaded portion with a head 5 of hexagonal outline at one end of said portion. At the upper end of the head 5 a projecting tongue 6 is formed, which is rectanguluar in outline and is of such dimensions that it will fit snugly in the slot 3. Curved faces 7—7 are also formed on the head 5 at opposite sides of the tongue 6 to fit snugly against the outer face of the hemispherical surface of the body 2.

This shank may be made out of hexagonal bar stock by turning down and threading a suitable portion of such a piece of stock, and then running the end of this piece against a rotating cutter to form the curved upper face of the tongue 6. A divided ball cutter with the two sections thereof spaced apart by a distance equal to the width of the tongue 6 is then used to form the faces 7—7, the radius of the cutter being equal to the radius of the hemispherical end of the body 2. A hole 8 is then drilled axially through the shank.

The body 2 may be formed by the punch and die process in a manner that will be obvious to those skilled in this art, and the slot 3 may also be formed by punching.

In assembling the parts, the surfaces 7—7 and the lateral faces of the tongue 6 are coated with a suitable flux. The body 2 is then set on the shank in the position shown in Fig. 1, and a few drops of melted solder are next run into the body. This solder will fill and effectually seal the seams and crevices between the parts 2 and 4 and secure these parts firmly together. Inasmuch as the parts are mechanically interlocked by the tongue and slot construction, the only function that the solder is required to perform is to fill the crevices between the parts and to hold the cup and shank against separation axially of the cup.

It will readily be appreciated that this construction is well adapted to withstand the strain imposed on the joint between the cup body and the shank when the cup is gripped with a pair of gas pliers for the purpose of turning it tightly into its operative position. The tongue and slot construction will stand practically any strain that can be transmitted by the cup body. At the same time, this construction can be manufactured very economically.

Figure 2:
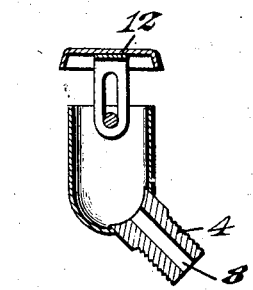

Fig. 2 shows a construction which is essentially like that shown in Fig. 1 except that the shank is located at an angle of 45° to the axis of the cup. The shank is made exactly in accordance with the showing in Fig. 4, and the only change in the cup construction is the difference in the location of the slot in the bottom of the cup body.

Figure 3:
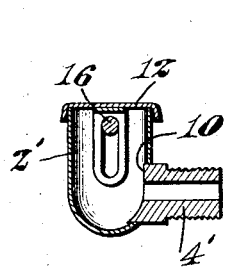
Figs. 2 and 3 are similar views of slightly different constructions.

Fig. 3 shows another construction in which the shank 4' is located at right angles to the cup body 2'. In this construction the end of the shank is required to fit against a surface, the lower part of which is of spherical contour, while the upper part is cylindrical in shape. The spherical surfaces on the end of the shank are formed in the manner above described in connection with the shank shown in Fig. 4, while the cylindrical surfaces are formed by relatively traversing the cutter and the shank in a direction at right angles to the axis of the shank. The same expedient also is used in shaping the upper end surface 10 of the tongue with the aid of the rotary cutter which is used to concave this face.

Figure 8:
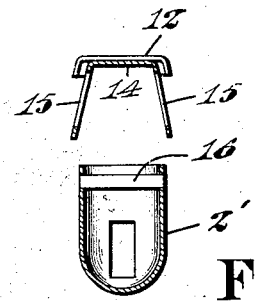
Fig. 8 is a vertical, central, cross-sectional view on the oil cup body and cover showing a step in the assembling operation.
Figure 7:
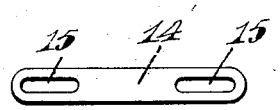
Fig. 7 is a plan view of the blank for the part that connects the cover with the oil cup body.

The cover 12 for the oil cup preferably consists of a circular disk having a depending marginal flange to fit over the edge of the cup body. This cover is connected to the body by a part formed by bending the blank 14, Fig. 7, into an inverted U-shape, as best shown in Fig. 8. The central portion of this piece is spot welded to the cover, and the opposite legs of this part are sprung away from each other, as clearly shown in Fig. 8, so that when they are squeezed toward each other and entered in the upper end of the cup 2', Fig. 8, they will bear against the opposite walls of the cup with considerable friction. Slots 15—15 are formed in these legs, and after they have been placed in the cup, a pin 16 is pushed through the slots and through two holes drilled in the opposite walls of the cup body 2' near its upper edge. The ends of this pin are then expanded or peened over to hold it in this position.

With this construction the cover can be moved in a direction axially of the body into either an open position, as shown in Fig. 2, or a closed position, as shown in Figs. 1 and 3. The friction of the legs of the part 14 against the sides of the body will hold it in either of these positions. In most forms of oil cup covers some spring means is provided for holding the cover in its closed position, and the fact that the cover tends constantly to close is often a nuisance in filling an oil cup. With the present arrangement the cover can be moved into its open position and left there while it is filled. Even in this position, however, the cover is over the top of the cup and prevents dirt from falling into it. But at this time free entrance is afforded for the end of an oil can spout into the cup.

It will now be appreciated that this invention provides an oil cup construction which is very sturdy and substantial and is well adapted to successfully withstand the rough usage to which devices of this character are subjected. At the same time this construction can be manufactured very economically. The cover arrangement also is more convenient to use than prior constructions of which I have been able to learn.

While I have herein shown and described the best embodiment of my invention that I have so far devised, it will be evident that the invention may be embodied in other forms without departing from the spirit or scope thereof.

Having thus described my invention, what I desire to claim as new is:

1. An oil cup comprising a cup-shaped body having a hemispherical end, a shank secured to said end, and a tongue projecting from said shank and fitting in a slot formed in said end of the body, said shank having faces at opposite sides of said tongue fitting snugly against the outer curved surface of the body, and said shank and tongue having a hole therethrough to drain oil from said body.

2. An oil cup comprising a cup-shaped body having a curved outer surface at the lower end thereof and provided with a long relatively narrow slot through said end, a shank secured to said body, and a projection from said shank fitting snugly in said slot, said shank having a face fitting against said curved outer surface of said body at opposite sides of said projection and having a hole therethrough communicating with the interior of said body.

FREDERICK M. FURBER.